(12) United States Patent
Hashimoto et al.

(10) Patent No.: US 10,345,752 B2
(45) Date of Patent: Jul. 9, 2019

(54) IMAGE FORMING APPARATUS THAT ASSOCIATES A PAPER FEED CONTROL TIME WITH A FILE NAME

(71) Applicant: KYOCERA Document Solutions Inc., Osaka (JP)

(72) Inventors: Shinichi Hashimoto, Osaka (JP); Kunihiko Shimamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/990,197

(22) Filed: May 25, 2018

(65) Prior Publication Data

US 2018/0352103 A1 Dec. 6, 2018

(30) Foreign Application Priority Data

May 30, 2017 (JP) .................................. 2017-106786

(51) Int. Cl.
*H04N 1/00* (2006.01)
*G03G 15/00* (2006.01)
*G06F 3/12* (2006.01)
*G06K 15/02* (2006.01)

(52) U.S. Cl.
CPC ..... *G03G 15/6564* (2013.01); *G03G 15/6558* (2013.01); *G06F 3/122* (2013.01); *G06K 15/18* (2013.01); *H04N 1/00652* (2013.01); *H04N 1/00933* (2013.01)

(58) Field of Classification Search
CPC ........... G03G 15/6564; G03G 15/6558; H04N 1/00933; H04N 1/00652
See application file for complete search history.

(56) References Cited

U.S. PATENT DOCUMENTS

| 2011/0064505 A1* | 3/2011 | Yoshida | G03G 15/6502 400/582 |
| 2015/0356385 A1* | 12/2015 | Naka | G06K 15/1807 358/1.15 |

FOREIGN PATENT DOCUMENTS

JP 6-64219 A 3/1994

* cited by examiner

*Primary Examiner* — Peter K Huntsinger
(74) *Attorney, Agent, or Firm* — Stein IP, LLC (57) ABSTRACT

When a file name corresponding to newly received print data is not stored, a control portion calculates a paper feed control time and associates the paper feed control time with the file name corresponding to the newly received print data and stores the paper feed control time and the file name in a storage portion whereas when the file name corresponding to the newly received print data is stored, with timing at which the paper feed control time associated with the file name corresponding to the newly received print data elapses after the start of RIP processing on a first page, the control portion starts the paper feed of a first sheet.

3 Claims, 5 Drawing Sheets

| FILE NAME | PAPER FEED CONTROL TIME |
|---|---|
| aaa | 5 SECONDS |
| bbb | 3 SECONDS |
| ccc | 2 SECONDS |

IMAGE FORMING APPARATUS THAT ASSOCIATES A PAPER FEED CONTROL TIME WITH A FILE NAME

INCORPORATION BY REFERENCE

This application is based upon and claims the benefit of priority from the corresponding Japanese Patent Application No. 2017-106786 filed on May 30, 2017, the entire contents of which are incorporated herein by reference.

BACKGROUND

The present disclosure relates to an image forming apparatus which prints an image on a sheet.

Conventionally, an image forming apparatus is known which transports a sheet and which prints an image on the sheet being transported. Such an image forming apparatus includes a sheet transport path for transporting a sheet from a paper feed position to a print position. In the paper feed position, a paper feed portion is installed, and in the print position, an image formation portion is installed. The paper feed portion feeds the sheet from the paper feed position to the sheet transport path. The image formation portion prints an image on the sheet transported from the paper feed position to the print position.

SUMMARY

An image forming apparatus according to an aspect of the present disclosure includes a communication portion, an image processing portion, a sheet transport path, a paper feed portion, a registration portion, an image formation portion, a control portion and a storage portion. The communication portion receives print data described in a page description language. The image processing portion performs RIP processing for analyzing and rasterizing the print data. The sheet transport path is used for transporting a sheet from a paper feed position, to a registration position and then to a print position in this order. The paper feed portion feeds the sheet from the paper feed position to the sheet transport path. The registration portion temporarily stops the progress of the sheet arriving at the registration position, and thereafter transports the sheet arriving at the registration position to the print position. The image formation portion prints an image based on image data obtained by the RIP processing on the sheet transported to the print position. The control portion controls the paper feed by the paper feed position. The storage portion associates a paper feed control time calculated by the control portion with a file name corresponding to the print data, and stores the paper feed control time and the file name. When the communication portion newly receives the print data, the control portion recognizes a file name corresponding to newly received print data which is the print data newly received by the communication portion, and when the file name corresponding to the newly received print data is not stored in the storage portion, the control portion measures a first page processing time that is a time which elapses after the start of the RIP processing on the data of a first page in the newly received print data until the completion thereof, calculates, as the paper feed control time, a time obtained by subtracting, from the first page processing time, a time obtained by dividing a sheet transport distance between the paper feed position and the registration position by a sheet transport speed and associates the calculated paper feed control time with the file name corresponding to the newly received print data and stores the paper feed control time and the file name in the storage portion. When the file name corresponding to the newly received print data is stored in the storage portion, with timing at which the paper feed control time associated with the file name corresponding to the newly received print data elapses after the start of the RIP processing on the data of the first page in the newly received print data, the control portion makes the paper feed portion start the paper feed of a first sheet.

DETAILED DESCRIPTION

<Configuration of Image Forming Apparatus>

Figure 1:
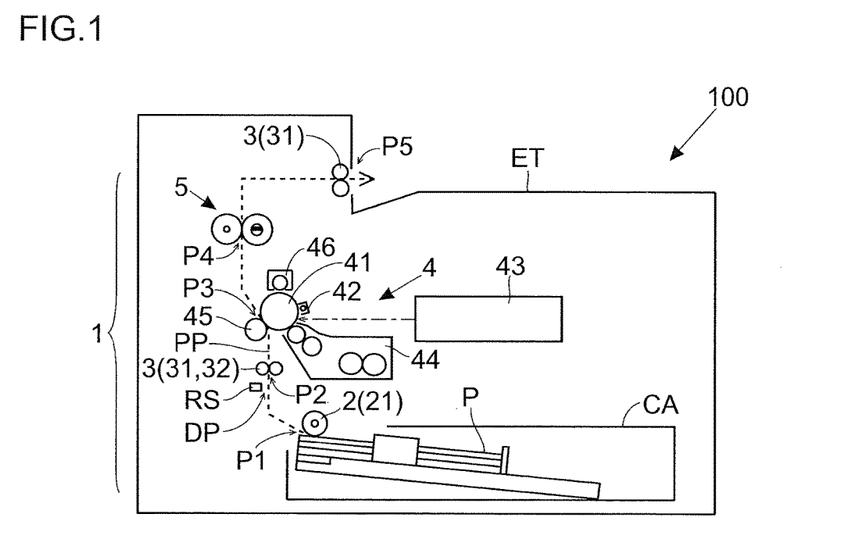
FIG. 1 is a schematic diagram showing the configuration of an image forming apparatus according to an embodiment of the present disclosure.

As shown in FIG. 1, the image forming apparatus 100 of the present embodiment includes a sheet transport path PP (indicated by a broken line) for transporting a sheet P. The sheet transport path PP is extended from a paper feed position P1 so as to pass through a registration position P2, a print position P3 and a fixing position P4 in this order and then arrive at an ejection position P5. In the paper feed position P1, a sheet cassette CA is installed which stores sheets P before being printed. In the ejection position P5, an ejection tray ET is installed which stores sheets P after being printed.

The image forming apparatus 100 also includes a print portion 1 which feeds the sheet P to the sheet transport path PP, which transports the sheet P along the sheet transport path PP and which prints an image on the sheet P being transported. The print portion 1 includes a paper feed portion 2, a transport portion 3, an image formation portion 4 and a fixing portion 5.

The paper feed portion 2 is installed in the paper feed position P1, and feeds the sheets P stored in the sheet cassette CA to the sheet transport path PP. The paper feed portion 2 includes a paper feed roller 21. The paper feed roller 21 makes contact with the sheet P stored in the sheet cassette CA, and is rotated in this state so as to draw the sheet P from the sheet cassette CA. Then, the paper feed portion 2 feeds the sheet P drawn from the sheet cassette CA to the sheet transport path PP (primary paper feed).

The transport portion 3 includes a plurality of transport roller pairs 31 which are installed on the transport path of the sheet P. Each of the transport roller pairs 31 forms a transport nip for nipping the sheet P and is rotated so as to transport the sheet P along the sheet transport path PP. The sheet P fed to the sheet transport path PP is transported from the paper feed position P1, to the registration position P2, to the print position P3, to the fixing position P4 and then to the ejection position P5 in this order.

One of the transport roller pairs 31 is a registration roller pair 32, and the registration roller pair 32 is installed in the registration position P2. The position of the transport nip (registration nip) of the registration roller pair 32 is the registration position P2. The registration roller pair 32 corresponds to a "registration portion".

The registration roller pair 32 stops its rotation when the sheet P arrives at the registration position P2. In this way, the progress of the sheet P which arrives at the registration position P2 is temporarily stopped. Here, the transport roller pair 31 (which is not shown in FIG. 1) installed in a position on the upstream side with respect to the registration position P2 in a sheet transport direction continues its rotation. Hence, deformation is formed at the tip end portion of the sheet P which arrives at the registration position P2. As described above, the progress of the sheet P is temporarily stopped in the registration position P2, and thus the skewing of the sheet P is corrected. Then, the registration roller pair 32 starts the rotation after the stop of the progress of the sheet P so as to transport the sheet P from the registration position P2 to the print position P3 (secondary paper feed).

The image formation portion 4 forms a toner image (image) to be printed on the sheet P, and transfers (prints) the toner image to the sheet P transported from the registration position P2 to the print position P3. The image formation portion 4 includes a photosensitive drum 41, a charging device 42, an exposure device 43, a development device 44, a transfer roller 45 and a cleaning device 46.

When the toner image is formed, the photosensitive drum 41 is rotated, and the surface of the photosensitive drum 41 is charged by the charging device 42 so as to have a predetermined potential. The exposure device 43 includes a light emitting element (unillustrated) which emits a light beam for exposure, and scans and exposes the surface of the photosensitive drum 41 while turning on and off the light emitting element. In this way, an electrostatic latent image is formed on the surface of the photosensitive drum 41. The development device 44 supplies a toner to the electrostatic latent image formed on the surface of the photosensitive drum 41 so as to develop the electrostatic latent image into the toner image.

The transfer roller 45 is pressed to the surface of the photosensitive drum 41 so as to form a transfer nip with the photosensitive drum 41. The position of the transfer nip is the print position P3. When the sheet P is passed through the print position P3 (the transfer nip), the toner image on the surface of the photosensitive drum 41 is transferred to the sheet P. The cleaning device 46 removes the toner and the like left on the surface of the photosensitive drum 41.

The fixing portion 5 includes a fixing roller pair (a heating roller and a pressure roller). The heating roller and the pressure roller are pressed to each other so as to form a fixing nip. The position of the fixing nip is the fixing position P4. The fixing portion 5 heats and pressurizes the sheet P which is passed through the fixing nip so as to fix the toner image transferred to the sheet P to the sheet P.

Figure 2:
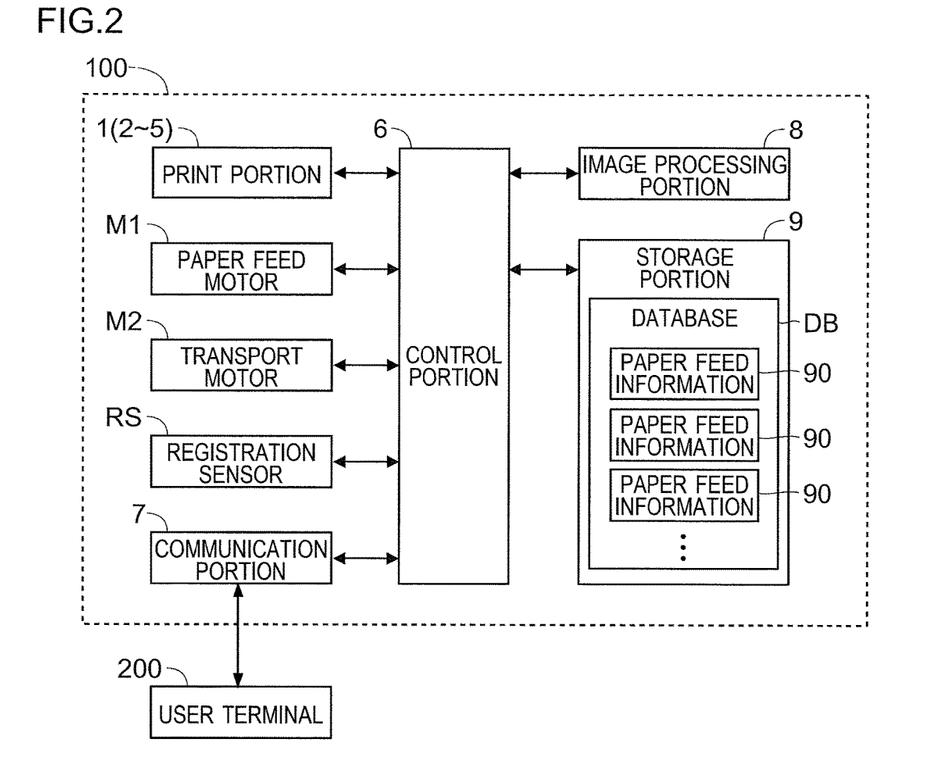
FIG. 2 is a block diagram showing the configuration of the image forming apparatus according to the embodiment of the present disclosure.

As shown in FIG. 2, the image forming apparatus 100 includes a control portion 6, a communication portion 7, an image processing portion 8 and a storage portion 9.

The control portion 6 includes a CPU. The control portion 6 is connected to the print portion 1. The control portion 6 is operated based on a program and data for control so as to perform print control processing for controlling printing performed by the print portion 1.

The control portion 6 performs, as one type of processing in the print control processing, processing for controlling the drive of motors for rotating various types of rotation members which deal with the transport (paper feed) of the sheet P. As the motors, for example, a paper feed motor M1 and a transport motor M2 are provided.

The paper feed motor M1 is a motor which rotates the paper feed roller 21 in the paper feed portion 2. For example, the paper feed roller 21 receives, through an unillustrated paper feed clutch, a driving force from the paper feed motor M1 and is thereby rotated. Then, the control portion 6 controls the turning on and off of the paper feed clutch so as to switch between the rotation of the paper feed roller 21 and the stop of the rotation.

The transport motor M2 is a motor which rotates the transport roller pairs 31 in the transport portion 3. For example, the registration roller pair 32 of the transport roller pairs 31 receives, through an unillustrated registration clutch, a driving force from the transport motor M2 and is thereby rotated. Then, the control portion 6 controls the turning on and off of the registration clutch so as to switch between the rotation of the registration roller pair 32 and the stop of the rotation.

The control portion 6 is connected to a sensor for controlling the transport (paper feed) of the sheet P. As the sensor, for example, a registration sensor RS is provided. The registration sensor RS is a transmission-type optical sensor which includes a light emitting portion and a light receiving portion, and a position DP (see FIG. 1) in front of the registration position P2 is set to a detection position. In other words, a position between the paper feed position P1 and the registration position P2 is set to the detection position DP. The registration sensor RS varies an output value according to whether or not the sheet P is present in the detection position DP.

The control portion 6 detects, based on the output value of the registration sensor RS, whether or not the sheet P is present in the detection position DP (the arrival of the tip end of the sheet P and the passage of the back end thereof). For example, the control portion 6 determines, based on the result of the detection, whether or not the tip end of the sheet P arrives at the registration position P2.

The communication portion 7 is an interface for connecting an external device to the image forming apparatus 100 such that they can communicate with each other, and includes a communication circuit, a communication memory, a communication connector and the like. The control portion 6 communicates with the external device through the communication portion 7. For example, a user terminal 200 which is used by a user of the image forming apparatus 100 is connected to the image forming apparatus 100 such that they can communicate with each other. The user terminal 200 is a personal computer (PC) or the like, and a printer driver is installed in the user terminal 200.

The user terminal 200 transmits print data which is generated in the user terminal 200. The print data transmitted from the user terminal 200 is PDL data which is described in a page description language (PDL). When the communication portion 7 receives the print data (PDL data), the control portion 6 determines that a request for executing a print job is received. Then, the control portion 6 executes the print job based on the print data.

The image processing portion 8 includes an image processing circuit and an image processing memory. The image processing portion 8 performs RIP (Raster Image Processor) processing for analyzing and rasterizing the page description language of the print data received by the communication portion 7 so as to convert the print data into image data (raster data). When the print data includes page data corresponding to a plurality of pages, the image processing portion 8 individually performs the RIP processing on page data corresponding to each of the pages (performs the RIP processing on an individual page basis).

The image processing portion 8 performs predetermined image processing (such as rotation processing, enlargement/reduction processing and concentration conversion processing) on the image data. Thereafter, the image processing portion 8 converts the image data on which the image processing has been performed into exposure image data (data for controlling the turning on and off of the light emitting element in the exposure device 43).

The image data generated by the image processing portion 8 is transferred to the print portion 1 (the exposure device 43 in the image formation portion 4). In this way, in the image formation portion 4, the electrostatic latent image based on the image data generated by the image processing portion 8 is formed, and the formed electrostatic latent image is developed into the toner image. Then, the toner image is transferred to the sheet P which is transported to the print position P3.

The storage portion 9 includes a nonvolatile memory (ROM) and a volatile memory (RAM). The control portion 6 reads information from the storage portion 9, and writes information into the storage portion 9. For example, information indicating a time which elapses after the tip end of the sheet P fed by the paper feed portion 2 leaves the paper feed position P1 until it arrives at the registration position P2 (a sheet transport time between the paper feed position P1 and the registration position P2) is previously stored in the storage portion 9. The sheet transport time between the paper feed position P1 and the registration position P2 is a time which is obtained by dividing a sheet transport distance (the length of the sheet transport path) between the paper feed position P1 and the registration position P2 by a sheet transport speed (linear speed). The storage portion 9 associates a paper feed control time calculated by the control portion 6 with a file name corresponding to the print data and stores them. The details thereof will be described later.

<Registration Processing>

Figure 3:
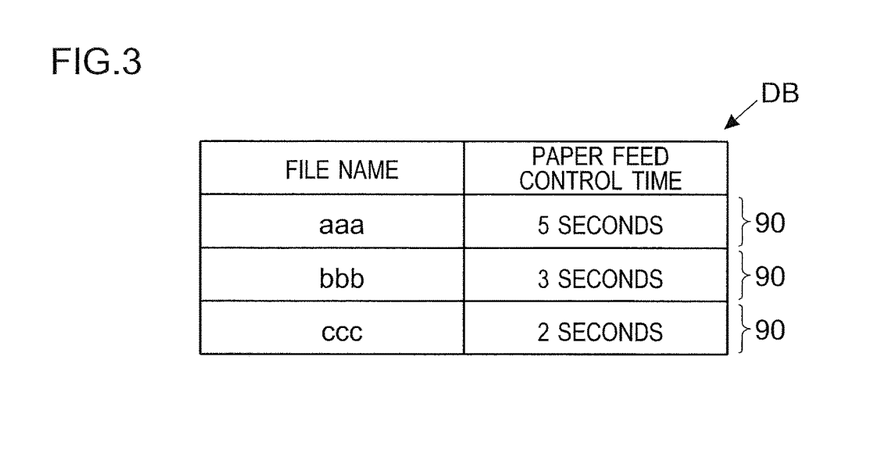
FIG. 3 is a diagram for illustrating paper feed information (information in which paper feed control times are associated with file names) which is stored in a storage portion of the image forming apparatus according to the embodiment of the present disclosure.

The storage portion 9 stores a database DB for controlling the paper feed (primary paper feed) of the sheet P to the sheet transport path PP by the paper feed portion 2. In the database DB, paper feed information 90 in which the paper feed control times calculated by the control portion 6 are associated with the file names corresponding to the print data is stored on an individual file name basis. An example of a correspondence between the paper feed control times and the file names is shown in FIG. 3.

The registration processing for storing (registering) the paper feed information 90 in the storage portion 9 is performed by the control portion 6. Specifically, when the communication portion 7 newly receives the print data, the control portion 6 recognizes a file name corresponding to the print data newly received by the communication portion 7 (in the following description, the print data newly received by the communication portion 7 is referred to as newly received print data). Then, when the paper feed information 90 in which the file name corresponding to the newly received print data is associated with the paper feed control time is not stored in the storage portion 9, the control portion 6 sets the file name corresponding to the newly received print data to a registration target so as to perform the registration processing.

Figure 4:
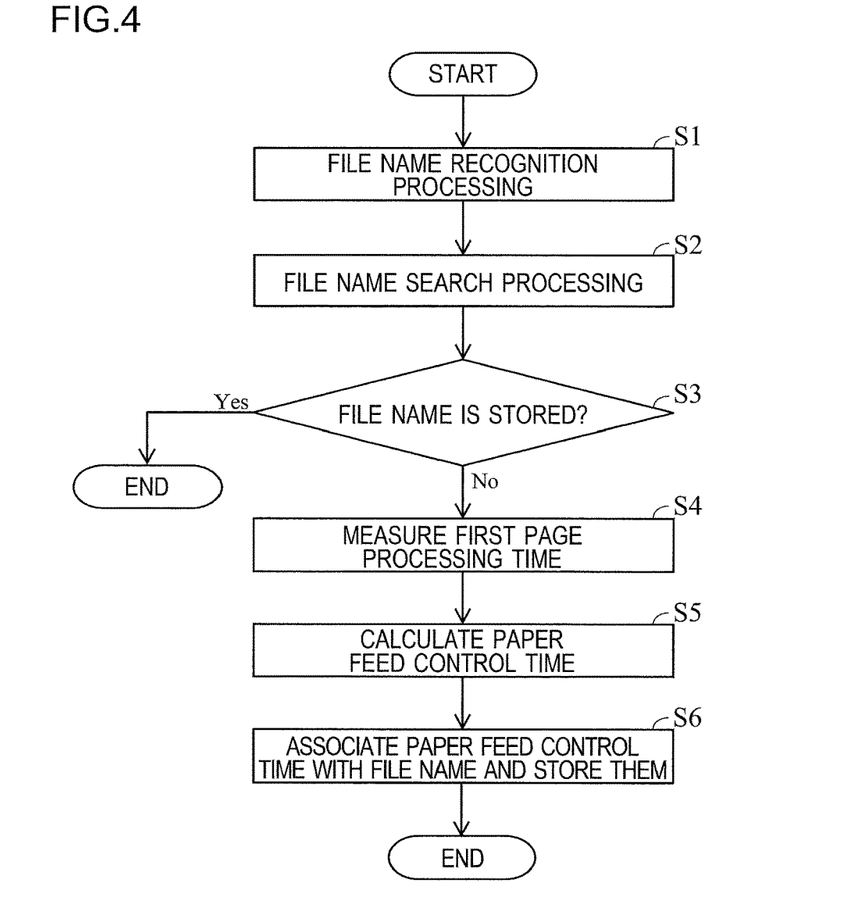
FIG. 4 is a flowchart showing the flow of registration processing which is performed by a control portion of the image forming apparatus according to the embodiment of the present disclosure.

The flow of the registration processing performed by the control portion 6 will be described below with reference to a flowchart shown in FIG. 4. The flowchart shown in FIG. 4 is started when the control portion 6 detects that the communication portion 7 newly receives the print data (PDL data).

In step S1, the control portion 6 performs file name recognition processing for recognizing the file name corresponding to the newly received print data. Here, the control portion 6 recognizes a specific file name allocated to the newly received print data as the file name corresponding to the newly received print data. Alternatively, when a paper feed control file name is added to the newly received print data separately from the specific file name, the control portion 6 recognizes, as the file name corresponding to the newly received print data, the paper feed control file name added to the newly received print data. For example, when the print data is transmitted from the user terminal 200 to the image forming apparatus 100, a setting as to whether or not the paper feed control file name is added to the print data and a setting of the paper feed control file name added to the print data can be performed in the user terminal 200.

In step S2, the control portion 6 performs file name search processing for searching the database DB for the file name (the file name recognized in the processing of step S1) corresponding to the newly received print data. Then, in step S3, the control portion 6 determines whether or not the file name corresponding to the newly received print data is found. In other words, the control portion 6 determines whether or not the file name corresponding to the newly received print data is stored in the storage portion 9.

When in step S3, the control portion 6 determines that the file name corresponding to the newly received print data is stored in the storage portion 9, the present flow is completed (the registration processing by the control portion 6 is not performed). On the other hand, when the control portion 6 determines that the file name corresponding to the newly received print data is not stored in the storage portion 9, the registration processing by the control portion 6 is performed. In this case, the process is transferred to step S4.

When the process is transferred to step S4, the control portion 6 measures a time (in the following description, referred to as a first page processing time) which elapses after the start of the RIP processing on the page data of the first page in the newly received print data until the completion thereof. In step S5, the control portion 6 calculates, as the paper feed control time, a time which is obtained by subtracting the sheet transport time (the time which elapses after the tip end of the sheet P fed by the paper feed portion 2 leaves the paper feed position P1 until it arrives at the registration position P2) between the paper feed position P1 and the registration position P2 from the first page processing time. The paper feed control time calculated here is a time which is shorter than the first page processing time.

Then, in step S6, the control portion 6 associates the file name corresponding to the newly received print data with the paper feed control time (the time calculated in the processing of step S5) and stores them in the storage portion 9. In this way, the paper feed information 90 in which the file name corresponding to the newly received print data is associated with the paper feed control time is additionally registered in the database DB.

<Timing Correction Processing>

Figure 5:
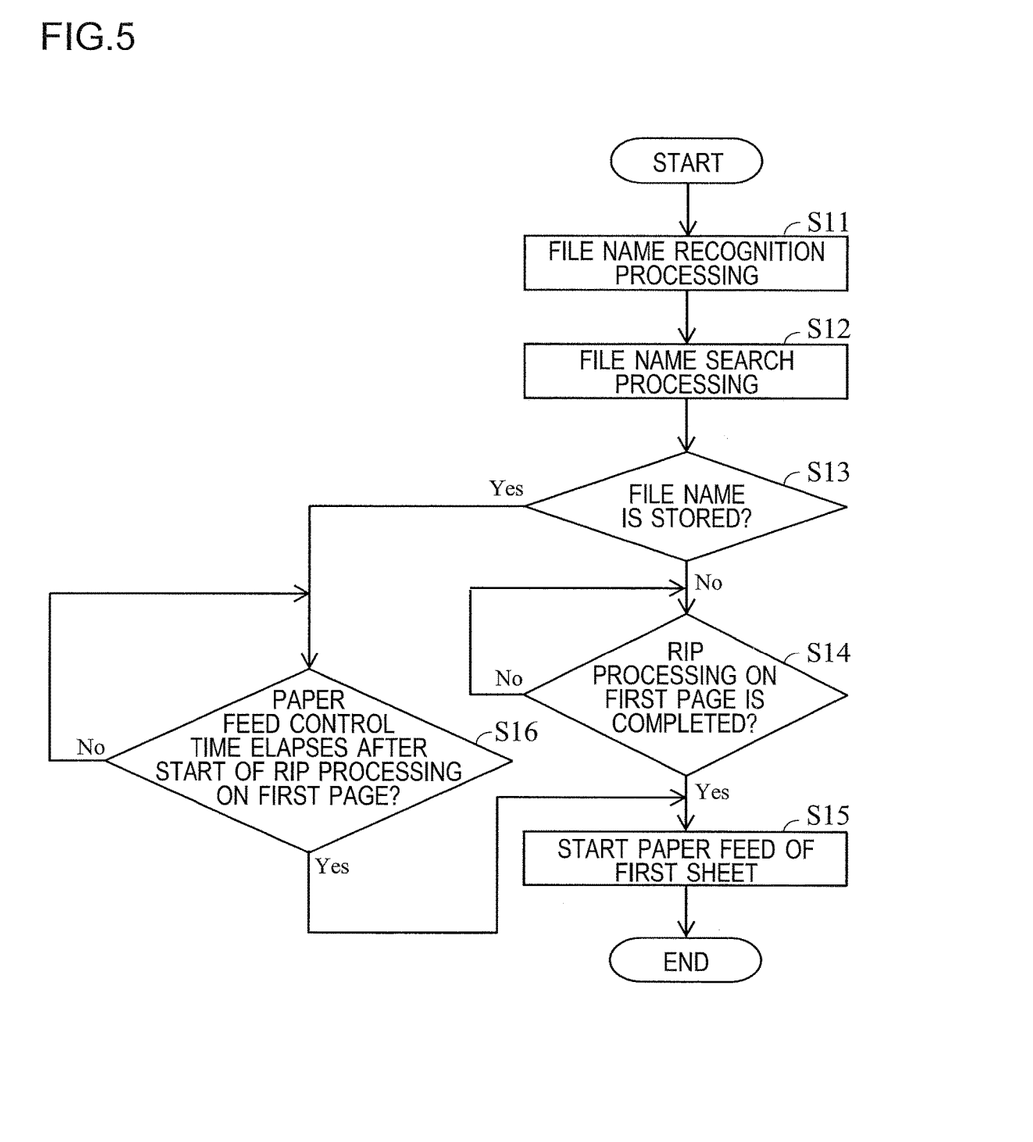
FIG. 5 is a flowchart showing the flow of timing correction processing which is performed by the control portion of the image forming apparatus according to the embodiment of the present disclosure.

When the communication portion 7 newly receives the print data, the control portion 6 recognizes the file name corresponding to the print data newly received by the communication portion 7 (in the following description, the print data newly received by the communication portion 7 is referred to as the newly received print data). Then, the control portion 6 performs, based on the file name corresponding to the newly received print data, timing correction processing for adjusting timing at which the paper feed of the first sheet performed by the paper feed portion 2 is started.

The flow of the timing correction processing performed by the control portion 6 will be described below with reference to a flowchart shown in FIG. 5. The flowchart shown in FIG. 5 is started when the control portion 6 detects that the communication portion 7 newly receives the print data (PDL data).

In step S11, the control portion 6 performs file name recognition processing for recognizing the file name corresponding to the newly received print data. The file name recognition processing performed here by the control portion 6 is the same as the processing of step S1 shown in FIG. 4. Specifically, when the paper feed control file name is not added to the newly received print data, the control portion 6 recognizes the specific file name allocated to the newly received print data as the file name corresponding to the newly received print data. On the other hand, when the paper feed control file name is added to the newly received print data, the control portion 6 recognizes, as the file name corresponding to the newly received print data, the paper feed control file name added to the newly received print data.

In step S12, the control portion 6 performs file name search processing for searching the database DB for the file name (the file name recognized in the processing of step S11) corresponding to the newly received print data. The file name search processing performed here by the control portion 6 is the same as the processing of step S2 shown in FIG. 4. Then, in step S13, the control portion 6 determines whether or not the file name corresponding to the newly received print data is found (whether or not the file name corresponding to the newly received print data is stored in the storage portion 9).

When in step S13, the control portion 6 determines that the file name corresponding to the newly received print data is not stored in the storage portion 9 (that the file name is not registered), the process is transferred to step S14. When process is transferred to step S14, the control portion 6 determines whether or not the RIP processing on the page data of the first page in the newly received print data is completed. Consequently, when the control portion 6 determines that the RIP processing on the page data of the first page in the newly received print data is completed, the process is transferred to step S15 whereas when the control portion 6 determines that the RIP processing on the page data of the first page in the newly received print data is not completed, the processing in step S14 (the determination of the control portion 6) is repeated.

When the process is transferred from step S14 to step S15, the control portion 6 makes the paper feed portion 2 start the paper feed of the first sheet. Specifically, when the file name corresponding to the newly received print data is not stored in the storage portion 9, with timing at which the RIP processing on the page data of the first page in the newly received print data is completed, the paper feed of the first sheet by the paper feed portion 2 is started. When the file name corresponding to the newly received print data is not stored in the storage portion 9, the registration processing (the processing in steps S4 to S6 shown in FIG. 4) by the control portion 6 is simultaneously performed.

When in step S13, the control portion 6 determines that the file name corresponding to the newly received print data is stored in the storage portion 9 (that the file name is registered), the timing correction processing by the control portion 6 is performed. In this case, the process is transferred to step S16. That the file name corresponding to the newly received print data is stored in the storage portion 9 means that the paper feed information 90 in which the file name corresponding to the newly received print data is associated with the paper feed control time is stored in the database DB (the paper feed control time associated with the file name corresponding to the newly received print data is present).

When the process is transferred to step S16, the control portion 6 recognizes the paper feed control time associated with the file name corresponding to the newly received print data. Then, the control portion 6 determines whether or not the time which elapses after the start of the RIP processing on the page data of the first page in the newly received print data reaches the paper feed control time associated with the file name corresponding to the newly received print data. Consequently, when the control portion 6 determines that the elapsed time reaches the paper feed control time, the process is transferred to step S15 whereas when the control portion 6 determines that the elapsed time does not reach the paper feed control time, the processing in step S16 (the determination of the control portion 6) is repeated.

When the process is transferred from step S16 to step S15, the control portion 6 makes the paper feed portion 2 start the paper feed of the first sheet. Specifically, when the file name corresponding to the newly received print data is stored in the storage portion 9, with timing at which the paper feed control time associated with the file name corresponding to the newly received print data elapses after the start of the RIP processing on the page data of the first page in the newly received print data, the paper feed of the first sheet by the paper feed portion 2 is started.

As described above, the image forming apparatus 100 of the present embodiment includes: the communication portion 7 which receives the print data described in the page description language; the image processing portion 8 which performs the RIP processing for analyzing and rasterizing the print data; the sheet transport path PP for transporting the sheet P from the paper feed position P1, to the registration position P2 and then to the print position P3 in this order; the paper feed portion 2 which feeds the sheet P from the paper feed position P1 to the sheet transport path PP; the registration roller pair 32 (the registration portion) which transports the sheet P arriving at the registration position P2 to the print position P3; the image formation portion 4 which prints the image based on the image data obtained by the RIP processing on the sheet P transported to the print position P3; the control portion 6 which controls the paper feed by the paper feed portion 2; and the storage portion 9 which associates the paper feed control time calculated by the control portion 6 with the file name corresponding to the print data and stores them. When the communication portion 7 newly receives the print data, the control portion 6 recognizes the file name corresponding to the newly received print data which is the print data newly received by the communication portion 7, and when the file name corresponding to the newly received print data is not stored in the storage portion 9, the control portion 6 measures the first page processing time that is the time which elapses after the start of the RIP processing on the page data of the first page in the newly received print data until the completion thereof, calculates, as the paper feed control time, the time obtained by subtracting, from the first page processing time, the time obtained by dividing the sheet transport distance between the paper feed position P1 and the registration position P2 by the sheet transport speed and associates the calculated paper feed control time with the file name corresponding to the newly received print data and stores them in the storage portion 9.

When the file name corresponding to the newly received print data is stored in the storage portion 9, with timing at which the paper feed control time associated with the file name corresponding to the newly received print data elapses after the start of the RIP processing on the page data of the first page in the newly received print data, the control portion 6 makes the paper feed portion 2 start the paper feed of the first sheet. When the file name corresponding to the newly received print data is not stored in the storage portion 9, with timing at which the RIP processing on the page data of the first page in the newly received print data is completed, the control portion 6 makes the paper feed portion 2 start the paper feed of the first sheet.

In the configuration of the present embodiment, it is possible to shorten a first print time while reducing the occurrence of a failure in which it is impossible to properly perform printing.

For example, it is assumed that the user transmits first print data (PDL data) from the user terminal 200 to the image forming apparatus 100. It is also assumed that the file name corresponding to the first print data is not registered. Here, it is assumed that the user sets the file name corresponding to the first print data to "ddd".

Figure 6:
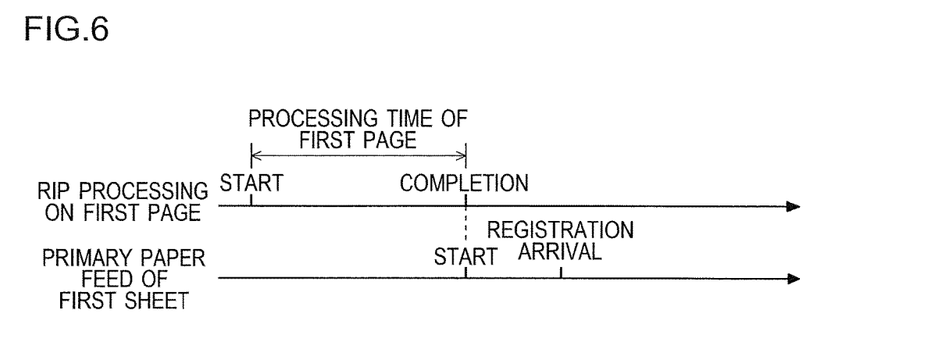
FIG. 6 is a diagram for illustrating timing control which is performed by the control portion of the image forming apparatus according to the embodiment of the present disclosure.

In this case, as shown in FIG. 6, when the RIP processing on the page data of the first page in the first print data is completed, the control portion 6 starts the paper feed portion (primary paper feed) of the first sheet by the paper feed portion 2. In other words, when a print job based on the first print data is executed, with timing at which after the completion of the RIP processing on the page data of the first page in the first print data, the sheet transport time between the paper feed position P1 and the registration position P2 (the time which elapses after the tip end of the sheet P fed by the paper feed portion 2 leaves the paper feed position P1 until it arrives at the registration position P2) elapses, the first sheet P arrives at the registration position P2. Hence, the occurrence of a failure in which before the completion of the RIP processing on the page data of the first page in the first print data, the first sheet P arrives at the print position P3 is prevented.

Figure 7:
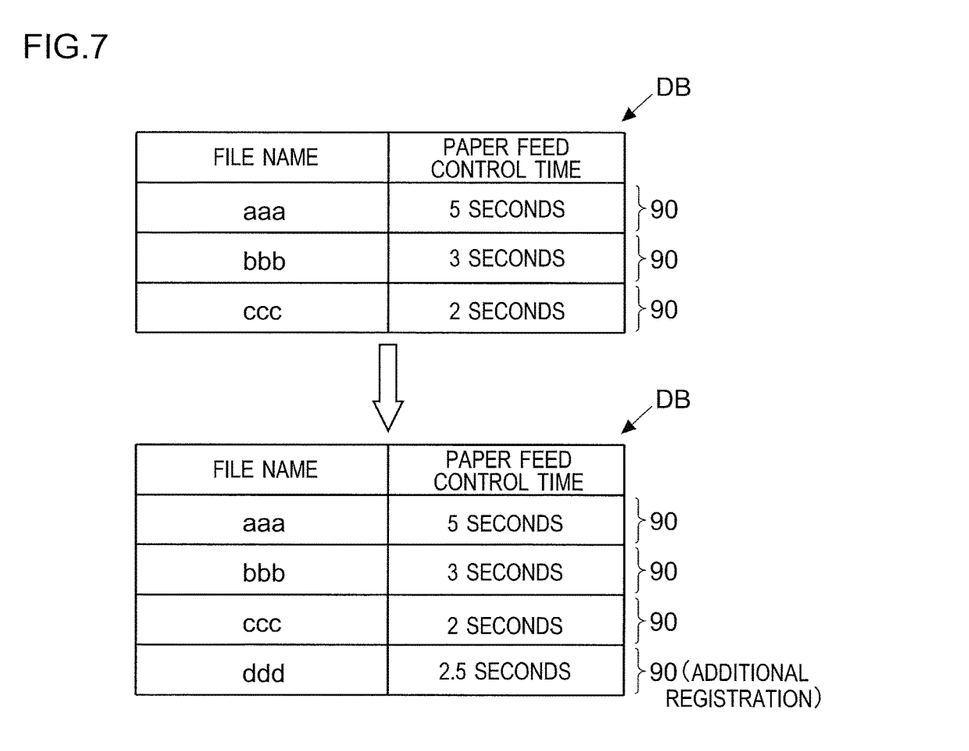
FIG. 7 is a diagram for illustrating the registration processing which is performed by the control portion of the image forming apparatus according to the embodiment of the present disclosure.

When the print job based on the first print data is executed, the control portion 6 measures the first page processing time (the time which elapses after the start of the RIP processing on the page data of the first page in the first print data until the completion thereof), and calculates the paper feed control time (which is assumed to be "2.5 seconds" here) by subtracting the sheet transport time between the paper feed position P1 and the registration position P2 from the first page processing time. Then, as shown in FIG. 7, the control portion 6 additionally registers, in the database DB, the paper feed information 90 in which the paper feed control time of "2.5 seconds" is associated with the file name of "ddd".

It is assumed that thereafter the user transmits, from the user terminal 200 to the image forming apparatus 100, second print data (PDL data) whose details are substantially the same as those of the first print data. It is also assumed that the user sets the file name corresponding to the second print data to "ddd" which is the same as the file name corresponding to the first print data.

Figure 8:
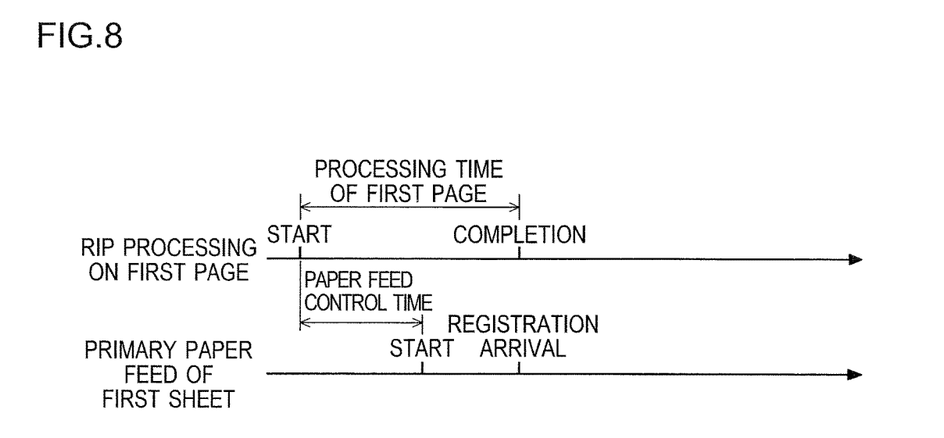
FIG. 8 is a diagram for illustrating the timing correction processing which is performed by the control portion of the image forming apparatus according to the embodiment of the present disclosure.

In this case, as shown in FIG. 8, with timing at which the paper feed control time of "2.5 seconds" associated with the file name of "ddd" elapses after the start of the RIP processing on the page data of the first page in the second print data, the control portion 6 starts the paper feed (primary paper feed) of the first sheet by the paper feed portion 2. In this way, in a print job based on the second print data, the first sheet P arrives at the registration position P2 earlier than in the print job based on the first print data. In other words, the first print time is shortened.

Here, since the details of the second print data are substantially the same as those of the first print data, the time (first page processing time) necessary to perform the RIP processing on the page data of the first page is substantially the same between the first print data and the second print data. Hence, when the print job based on the second print data is executed, if the paper feed of the first sheet is started with timing at which the paper feed control time of "2.5 seconds" associated with the file name of "ddd" elapses after the start of the RIP processing on the page data of the first page in the second print data, the timing at which the RIP processing on the page data of the first page in the second print data is completed substantially coincides with the timing at which the first sheet P arrives at the registration position P2. In other words, the RIP processing on the page data of the first page in the second print data is completed until the first sheet P arrives at the print position P3. In this way, the occurrence of a failure in which it is impossible to properly perform printing is prevented.

In the case of the example described above, when the second print data is transmitted from the user terminal 200 to the image forming apparatus 100, the file name corresponding to the first print data is only allocated as the specific file name to the second print data, and thus it is possible to shorten the first print time while reducing the occurrence of the failure in which it is impossible to properly perform printing. When it is not desired to change the specific file name allocated to the second print data, as the paper feed control file name, the file name corresponding to the first print data is preferably added to the second print data.

The embodiment disclosed here should be considered to be illustrative in all respects and not restrictive. The scope of the present disclosure is indicated not by the description of the embodiment discussed above but by the scope of claims, and furthermore, meanings equivalent to the scope of claims and all modifications within the scope are included.

What is claimed is:

1. An image forming apparatus comprising:
   a communication portion which receives print data described in a page description language;
   an image processing portion which performs RIP processing for analyzing and rasterizing the print data;
   a sheet transport path for transporting a sheet from a paper feed position, to a registration position and then to a print position in this order;

a paper feed portion which feeds the sheet from the paper feed position to the sheet transport path;

a registration portion which temporarily stops progress of the sheet arriving at the registration position and which thereafter transports the sheet arriving at the registration position to the print position;

an image formation portion which prints an image based on image data obtained by the RIP processing on the sheet transported to the print position;

a control portion which controls paper feed by the paper feed position; and a storage portion which associates a paper feed control time calculated by the control portion with a file name corresponding to the print data and which stores the paper feed control time and the file name, wherein when the communication portion newly receives the print data, the control portion recognizes a file name corresponding to newly received print data which is the print data newly received by the communication portion, and when the file name corresponding to the newly received print data is not stored in the storage portion, the control portion measures a first page processing time that is a time which elapses after start of the RIP processing on data of a first page in the newly received print data until completion thereof, calculates, as the paper feed control time, a time obtained by subtracting, from the first page processing time, a time obtained by dividing a sheet transport distance between the paper feed position and the registration position by a sheet transport speed and associates the calculated paper feed control time with the file name corresponding to the newly received print data and stores the paper feed control time and the file name in the storage portion, and when the file name corresponding to the newly received print data is stored in the storage portion, with timing at which the paper feed control time associated with the file name corresponding to the newly received print data elapses after the start of the RIP processing on the data of the first page in the newly received print data, the control portion makes the paper feed portion start the paper feed of a first sheet.

2. The image forming apparatus according to claim 1,
wherein the control portion recognizes a specific file name allocated to the newly received print data as the file name corresponding to the newly received print data or recognizes, when a paper feed control file name is added to the newly received print data separately from the specific file name, the paper feed control file name as the file name corresponding to the newly received print data.

3. The image forming apparatus according to claim 1,
wherein when the file name corresponding to the newly received print data is not stored in the storage portion, with timing at which the RIP processing on the data of the first page in the newly received print data is completed, the control portion makes the paper feed portion start the paper feed of the first sheet.

* * * * *